JOHN H. SMITH.
Improvement in Saw-Mills.
No. 126,843. Patented May 14, 1872.
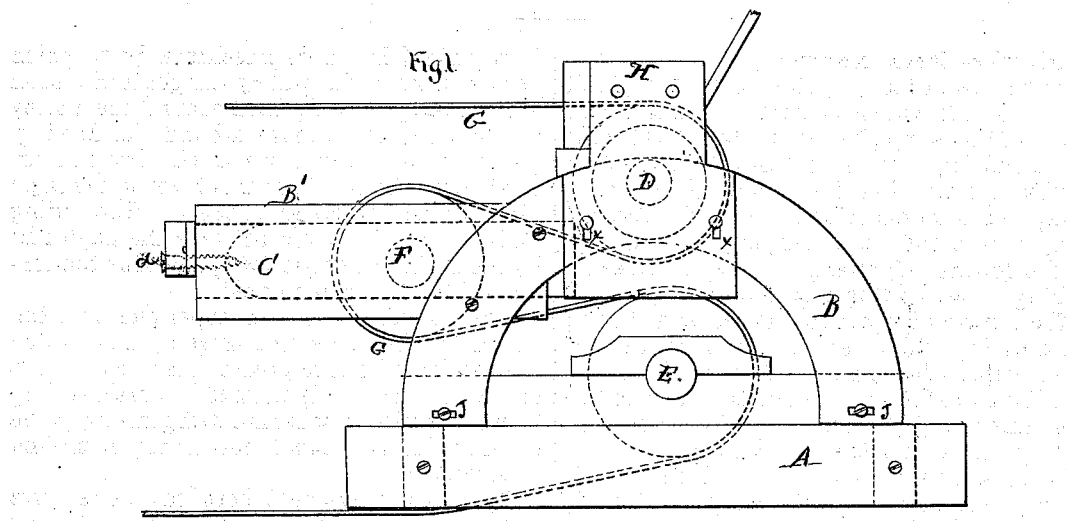
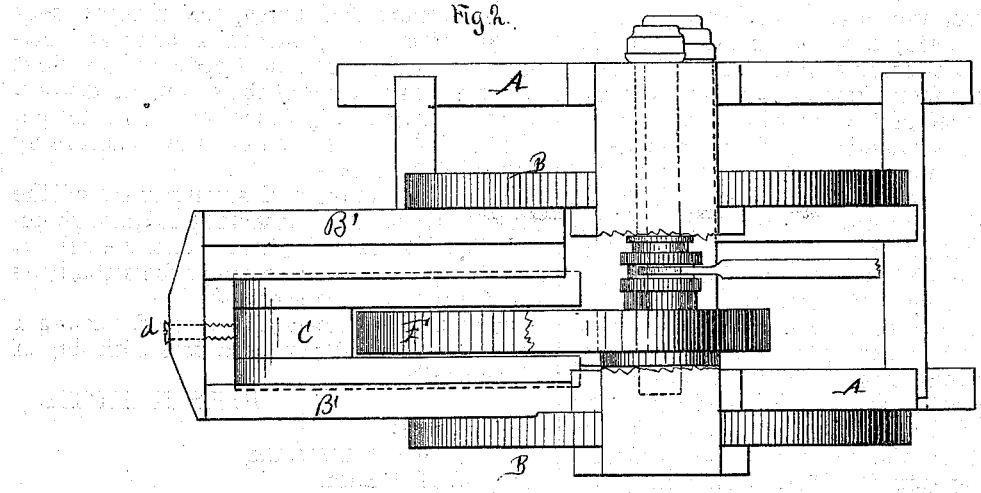
Witnesses
James E. Hutchinson
C. L. Evert
Inventor
John H. Smith
per
Alexander Mahy
Attorneys.

UNITED STATES PATENT OFFICE.

JOHN H. SMITH, OF SHELL MOUND, MISSISSIPPI.

IMPROVEMENT IN SAW-MILLS.

Specification forming part of Letters Patent No. 126,843, dated May 14, 1872.

*To all whom it may concern:*

Be it known that I, JOHN H. SMITH, of Shell Mound, in the county of Sunflower and in the State of Mississippi, have invented certain new and useful Improvements in Saw-Mills; and do hereby declare that the following is a full, clear, and exact description thereof, reference being had to the accompanying drawing and to the letters of reference marked thereon making a part of this specification.

The nature of my invention consists in the construction and arrangement of certain devices, which will be hereinafter described, for running two saws in the same time and in the same direction by means of one belt, and regulating the same, as will be set forth.

In the annexed drawing, of which Figure 1 is a side elevation and Fig. 2 a plan view, A represents the frame of the machine, which is constructed in any usual and substantial manner. E represents a shaft, which lies crosswise of the frame, and having its bearings in it. This shaft carries a pulley or drum near its center and a circular saw on one end. Connected to the main frame is a movable framework composed of the curved supports B, the box H, and the guide-bars B' B'. D represents a shaft, which carries a circular saw on its outer end above the saw on shaft E, and which has its bearings in the box H. This shaft is provided also with a drum or pulley and a clutch-pulley. This clutch-pulley is operated by a suitable lever for that purpose. The box H is not permanently secured to the curved supports B, but by means of slots and set-screws, whereby the distance between the saws can be changed by raising or lowering said box. The guide-bars B' B' are secured or made fast to the supports B, and embrace between them a sliding pulley-box, C. Within the pulley-box is a pulley, F. G represents a belt, which passes around the pulley on shaft E; then around the pulley F; then around the pulley on shaft D; and thence around the driving-pulley, which moves the saws. By this arrangement the two saws are driven in the same direction and at the same speed. The sliding pulley-box G is moved between the guides B' by means of the set-screw d, and thus the tension of the belt is regulated.

Great trouble has been experienced in the use of two belts for two saws because where the tension of one is greater than that of the other, and one saw is allowed to partially stop its work while the other is cutting strongly, the saw of the loose belt will necessarily be broken to pieces.

By this arrangement both saw-belts have the same tension, and there can never be any danger of breaking or damaging either from the cause mentioned.

The supports B B are capable of adjustment on the frame A by means of slots and set-screws at J J. The object of this adjustment is to govern the angle of the saw while at work.

Having thus fully described my invention, what I claim as new, and desire to secure by Letters Patent, is—

The construction and arrangement of the curved support B, adjustable box H, and guide-bars B' with the pulley-box C and the belt G, all constructed and operating substantially as and for the purpose set forth.

In testimony that I claim the foregoing I have hereunto set my hand this 20th day of March, 1872.

JOHN H. SMITH.

Witnesses:
C. M. ALEXANDER,
J. M. MASON.